United States Patent [19]
DuBois

[11] Patent Number: 5,933,127
[45] Date of Patent: Aug. 3, 1999

[54] ELECTRONIC STEREOSCOPIC DISPLAY

[75] Inventor: Philip M. DuBois, Peterborough, N.H.

[73] Assignee: The Rowland Institute for Science, Cambridge, Mass.

[21] Appl. No.: 08/986,316

[22] Filed: Dec. 5, 1997

Related U.S. Application Data

[60] Provisional application No. 60/032,470, Dec. 6, 1996.

[51] Int. Cl.$^6$ .................................................. G09G 3/36
[52] U.S. Cl. ................................................ 345/87; 345/9
[58] Field of Search ................................ 345/7, 8, 9, 89, 345/87, 139, 147

[56] References Cited

U.S. PATENT DOCUMENTS

| | | | |
|---|---|---|---|
| 4,647,966 | 3/1987 | Phillips et al. ............................. | 358/88 |
| 4,792,850 | 12/1988 | Liptoh et al. .............................. | 358/92 |
| 5,629,798 | 5/1997 | Gaudreau ................................. | 359/465 |

FOREIGN PATENT DOCUMENTS

| | | |
|---|---|---|
| 0 477 882 | 4/1992 | European Pat. Off. . |
| WO 96/18268 | 6/1996 | WIPO . |
| WO 98/25414 | 6/1998 | WIPO . |

*Primary Examiner*—Matthew Luu
*Attorney, Agent, or Firm*—Thomas J. Engellenner; Nutter, McClennen & Fish, LLP

[57] ABSTRACT

An apparatus and method for generating a stereo image that is perceived as a three-dimensional image when viewed through polarizing spectacles having orthogonally polarized lenses. The apparatus includes an illuminator that generates light of variable intensity, a modulator that generates an illumination control signal for controlling the intensity of light emitted by the illuminator, a polarizer for polarizing the light generated by the illuminator, and a distributor for changing the plane of polarization of the polarized light.

30 Claims, 4 Drawing Sheets

ELECTRONIC STEREOSCOPIC DISPLAY

REFERENCE TO RELATED APPLICATIONS

This application claims the benefit of U.S. Provisional Application No. 60/032,470, filed Dec. 6, 1996.

BACKGROUND OF THE INVENTION

This invention relates to improved methods and apparatus for electronically displaying a stereo pair of images needed to form a three-dimensional image.

A viewer of a two-dimensional image perceives depth when the two-eyes of the viewer see slightly different images of a three-dimensional scene. The brain of the viewer transforms the different images viewed by the left eye and right eye into information relating to the depth of the image.

An electronic stereo pair signal can be represented by: a left eye signal, Lxy, where x and y are the xy-coordinates of the image pixels and $L_{xy}$ is the brightness signal at the pixel with coordinates x, y; and by a right eye signal, Rxy, where x and y are the xy-coordinates of the image pixels and Rxy is the brightness signal at the pixel with coordinates x, y. Lxy and Rxy thus represent the intensity, or energy per unit area, for the left and right eye signals at the coordinates x, y. At present there exist two primary techniques of presenting an electronic stereo pair signal to a viewer such that a three-dimensional image is perceived. The first technique relies upon temporal multiplexing while the second technique relies upon spatial multiplexing to form a stereoscopic image.

In the first technique the two signals, Lxy and Rxy, can be provided in a temporally alternating sequential manner to a TV monitor, CRT, liquid crystal display, or other image display device so that at any point in time only one image (represented by either Lxy or Rxy) is present and visible. Downstream of the image display device, the system includes elements for enabling the left eye of the viewer to see only the left eye image Lxy and for enabling the right eye of the viewer to see only the right eye image Rxy. This can be achieved by having the viewer wear shuttering eyeglasses that are linked to and synchronized with the image display device. In another temporal multiplexing scheme, the image display device can be overlain by a fast switching polarizing device which polarizes the left-eye image one way and the right-eye image orthogonally so that the observer can simply wear passive polarizing glasses with the axis of polarization of the left-eye glass orthogonal to that of the right eye.

These systems, however, require very high speed imaging devices that can iteratively present a left-eye image, then erase it completely, then present a right-eye image, and then erase it completely. Temporal multiplexing systems also require equally high speed and efficient shutters or alternating polarizing devices.

A second prior art technique spatially multiplexes two signals, Lxy and Rxy. To multiplex the signals, the Lxy and Rxy signals are first segmented into two vertical columns of pixels. Two Lxy columns are then laterally compressed into one vertical column and two Rxy laterally columns are compressed into another vertical column. The laterally compressed Lxy and Rxy columns are then spatially alternated in the image signal. This technique creates a single image in which every other vertical column is the average of two columns of Lxy and each of the intervening columns is the average of two Rxy columns. The formed image is a spatially multiplexed signal of Lxy and Rxy. The spatially multiplexed image signal is then fed into an image-producing device in front of which is an array of polarizing micro strips. The polarizing micro strips must be oriented so that each column of compressed Lxy signals is aligned with strips of polarizers oriented along a first polarizing axis, and so that each column of compressed Rxy signals is aligned with strips of polarizers having a polarizing axis orthogonal to the first polarizing axis. The stereo pair can be then viewed with a set of passive polarizing glasses.

In addition to having complicated schemes for aligning the image producing device with the polarizing micro strips, the spatially multiplexing system also suffer from a loss of resolution in the stereoscopic image formed. In particular, spatial multiplexing systems inherently suffer from poor resolution caused by the compression of two columns of image data into one column of image data.

Accordingly, it is an object of the invention to electronically display a stereo pair of images having higher spatial resolution and improved temporal clarity.

These and other objects will be apparent from the description that follows.

SUMMARY OF THE INVENTION

The objects of the invention are achieved with an electronic stereoscopic display that forms a stereo image from two-dimensional representations of left and right eye images, the electronic stereoscopic display comprising an illuminator that generates light of variable intensity, a modulator that generates an illumination control signal for controlling the intensity of light emitted by the illuminator, a polarizer for polarizing the light generated by the illuminator, and a distributor for changing the plane of polarization of the polarized light. The modulator causes the illuminator to generate light representative of the combined spacial intensities of the left and right eye images, and the distributor changes the polarized light so that the left-eye image is contained in a plane of polarization orthogonal to the plane of polarization of the right-eye image.

A viewer wearing passive polarizing glasses and viewing the light beams formed by the electronic stereoscopic display can perceive a three-dimensional image. The three-dimensional image formed does not suffer from a loss in spatial or temporal resolution. At all times, each point in the left-eye image and the right-eye image are contained in the three-dimensional image. In fact, temporal changes in the three-dimensional image only reflect temporal changes in the left or right-eye images. The invention achieves these results by forming an image that superimposes the left-eye and right-eye images in a format that can later be decomposed into the original left-eye and right-eye images with a set of passive polarizers.

One of the primary problems in creating two images, one for the left-eye and the other for the right-eye, is that if the image creating devices are in the same image plane at which the eyes are looking, they interfere with each other. The invention solves this problem by including a modulator that adds the spatial intensity (or energy per unit area per unit time) distribution signals Lxy and Rxy to create a single new spatial intensity distribution signal Mxy according to the equation Mxy=Lxy+Rxy. The modulator can also include a processor that generates an illumination control signal Mxy for each pixel in the left and right eye images. In particular, the processor can form an array Mxy that maps onto each picture element in the illuminator the sum of: (1) a spatial intensity associated with a pixel in the left-eye image, and (2) a spatial intensity associated with a pixel in the right eye image.

The distributor can distribute to the left-eye the appropriate fraction of the combined image signal $M_{xy}$, and can distribute to the right-eye the appropriate fraction of the combined image signal Mxy. The distributor can include an optical controller and a controllable optical element. Typically, the optical controller generates an output signal $\phi$, as a function of left-eye intensity distribution and the right-eye intensity distribution. The output signal $\phi$ identifies the rotation angle of the plane of polarization. The controllable optical element is an optical element capable of rotating the plane of polarization of a beam of light in response to the output signal $\phi$. For example, the controllable optical element can be a liquid crystal display. Preferably, the output signal $\phi$ is calculated according to the equation, $\phi xy = \arctan(\sqrt{Rxy/Lxy})$.

Alternative aspects of the distributor provide for a distributor having a birefringent controller and a controllable birefringent material. The birefringent controller determines a preferred angle of retardation $\alpha_{xy}$ as a function of the left-eye intensity distribution and the right-eye intensity distribution, and the controllable birefringent material then introduces a phase difference between the ordinary and extraordinary components of the polarized light in response to the determined angle of retardation. Preferably, the output signal $\alpha_{xy}$ is calculated according to the equation, $\alpha xy = 2 \arctan(\sqrt{Rxy/Lxy})$.

Further features of the invention provide for a distributor that cycles between a first state and a second state. In the first state the distributor transmits the left-eye image, and in the second state the distributor transmits the right-eye image. For instance, the distributor can include a birefringent control element that cycles the angle of retardation of the birefringent material between approximately 0 degrees and approximately 180 degrees. Cycling the angle of retardation between these two extremes alternatively displays the left-eye image and the right-eye image. In another embodiment, the distributor can include an optical controller that cycles the controllable optical element (i.e. a liquid crystal display) between a first angle of polarization and a second angle of polarization such that the left-eye image and the right-eye images are alternatively displayed.

Other embodiments of the invention provide for a method of electronically displaying a left-eye image and a right-eye image so that the viewer can perceive a three-dimensional image. The method includes the steps of generating an illumination control signal Mxy, forming a beam of light having an intensity responsive to the illumination control signal Mxy, polarizing the beam of light, and changing the plane of polarization of the polarized light.

Both the illumination control signal and the change in the plane of polarization of the polarized light can be separately calculated as a function of the intensity distributions of the left and right-eye images. In particular, the illumination control signal Mxy can be calculated according to the equation Mxy=Lxy+Rxy; and the angular change in the plane of polarization, $\phi$, can be calculated according to the $\phi = \arctan(\sqrt{Rxy/Lxy})$.

A further aspect of this invention provides for the step of changing the changing the polarization of the polarized light by introducing a phase difference between the ordinary and extraordinary components of the polarized beam of light. The phase difference between the ordinary and extraordinary components can be created by passing the polarized light through a birefringent material having an angle of retardation, $\alpha_{xy}$. The angle of retardation $\alpha_{xy}$ can be calculated as a function of the intensity distribution of the left and right-eye images, namely $\alpha_{xy} = 2 \arctan(\sqrt{Rxy/Lxy})$.

BRIEF DESCRIPTION OF THE DRAWINGS

For a fuller understanding of the nature and objects of the invention, reference should be made to the following detailed description and the accompanying drawings, in which.

DETAILED DESCRIPTION OF THE INVENTION

Figure 1:
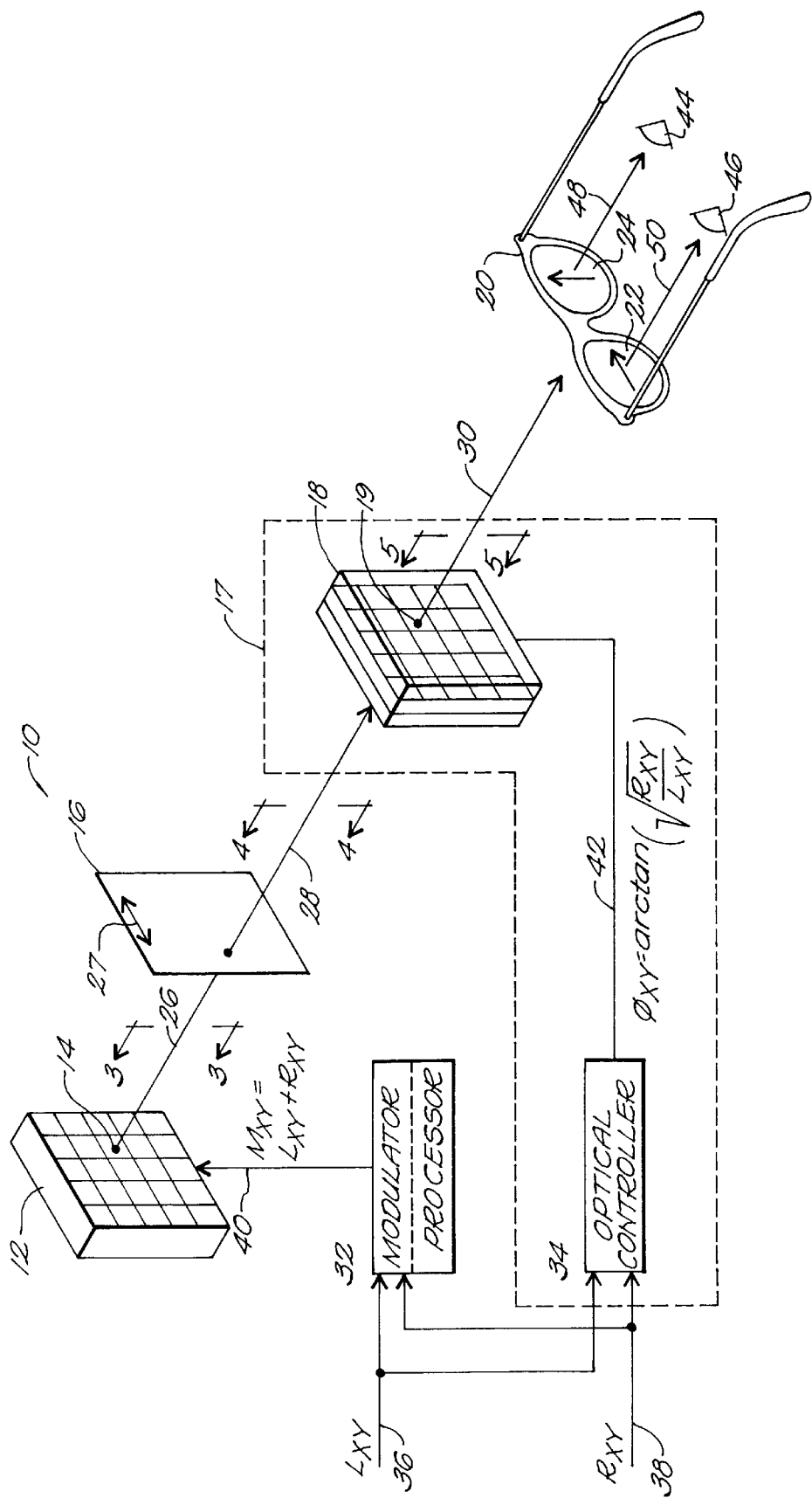
FIG. 1 is a schematic exploded view of an electronic stereoscopic display according to the invention.

FIG. 1 illustrates, in an exploded view, an electronic stereoscopic display 10 according to the invention. The electronic stereoscopic display 10 includes an illuminator 12, a modulator 32, a polarizer 16, and a distributor 17. In operation, the modulator receives a data set 36 (i.e., Lxy) representing the left-eye image and a data set 38 (i.e., Rxy) representing the right-eye image. The modulator generates an output signal 40 (i.e., Mxy) for controlling the illuminator 12. The illuminator 12 generates a beam of light 26 in response to the output signal Mxy, which is subsequently polarized by polarizer 16 to form a polarized light beam 28 oriented along a polarizing axis 27. The distributor 17 then changes the plane of polarization of the polarized light beam 28 to form a distributed light beam 30. An analyzer 20 forms a left-eye image 50 and a right-eye image 48 from the distributed light beam 30.

The final image represented by distributed light beam 30 can be viewed with passive polarizing glasses such as the analyzer 20. For each point in the final image there are at all times both a left-eye image and a right-eye image. There is no need for fast switching and changing of images or the careful alignment of polarizing strips. In fact, the only temporal changes in the output are those that reflect real temporal changes in the left-eye and right-eye images 36, 38.

The illuminator 12 can have a plurality of picture elements 14, each of which is capable of generating the beam of light 26. The picture elements preferably form an array of elements extending in two orthogonal directions, as shown in FIG. 1. The picture elements can be controlled to vary the intensity of the beam of light over time. The picture elements can be sized so that each picture element represents one pixel in either the left-eye image or the right-eye image. As described herein, each picture element can generate a beam of light corresponding to both a pixel of the left-eye image and a pixel of the right-eye image. The invention allows the beam of light generated by the picture element 14 to be later decomposed into both a left-eye pixel and a right-eye pixel.

The illuminator 14 can be a matrix of electroluminescent diodes (LEDs), a CRT, a liquid crystal display, or any other suitable display known in the art. Many liquid crystal displays produce an image that is obliquely polarized such that it passes through the left-eye glass of a standard pair of polarizing glasses used for 3-D work and is blocked by the right-eye glass. If the output of the illuminator 14 is so polarized, then there is no need for the polarizer 16.

The modulator 32 is a control block that receives as input the left-eye image data set 36 and the right-eye image data set 38. The modulator 32 generates the illumination control signal 40 in response thereto. The modulator, in one aspect of the invention, can also include a processing section 52 for generating the control signal 40 in response to the input signals 36 and 38. The modulator 32 and its associated processor 52 can be implemented using electronic hardware or software instructions.

In one aspect of the invention, the modulator 32 generates the illumination control signal 40 by summing the intensity distribution for the left-eye image Lxy and the energy distribution for the right-eye image Rxy. The processor 52 generates the control signal Mxy according to the equation Mxy=Lxy+Rxy. The control signal Mxy represents the intensity distributions for both the left and right eyes combined.

The left-eye image signal 36 is added to the right-eye image signal 38 to form the illumination control signal 40 because each of these signals represent desired intensity values for forming an image. Intensity of a beam of radiation is based upon the energy of the beam of radiation, and energy of the beam depends upon the square of the electric field in the beam of radiation. Accordingly, when two intensity signals are superimposed, the value of the signals are summed to form the value of the superimposed signal.

Other features of the modulator 32 provide for a modulator that generates the illumination control signal 40 by summing the energy intensities for the left and right eye images on a pixel by pixel basis. Accordingly, the resultant Mxy signal is a matrix of data having a value associated with various x,y coordinates. The data in Mxy is used to control the intensity values of each picture element 14 in illuminator 12.

The polarizer 16 is a filter that polarizes the beam of light 26 along a polarizing axis 27 to form the beam of polarized light 28. The orientation of the polarizing axis 27 is not critical and can be at any consistent angle. The most common polarizing filter is a material known by the trade name Polaroid, widely used for sunglasses and polarizing filters for cameral lenses. This material works on a principle of preferential absorption, passing waves polarized parallel to the polarizing axis of the material, but offering only a small percentage of transmission to waves with polarization perpendicular to the polarizing axis.

The distributor 17 changes the plane of polarization of the polarized light 28 to form a distributed beam of light 30. The distributed beam of light 30 remains polarized, however, the orientation of the polarizing axis in the beam 30 may have changed from the orientation of the polarizing axis in the beam 28. The distributor can include one or more picture elements 19, each of which is capable of independently changing the plane of polarization of incoming beams of light. Preferably, the distributor 17 includes an array of picture elements having a one to one correspondence with the picture elements 14 in the illuminator 12.

Accordingly, each element 19 of the distributor 17 changes the polarization of a beam of light that originates with an element 14 of the illuminator 12. The distributor changes the beam of light such that the resulting distributed light beam 30 has: (1) a component of light parallel to the polarizing axis 22 and having an intensity corresponding to the desired left-eye image 36; and (2) a component of light parallel to the polarizing axis 24 and having an intensity corresponding to the desired right-eye image 38. The distributed beam of light can then be decomposed into left and right-eye images by an analyzer 20 having one lens with a polarizing axis 22 and having another lens with a polarizing axis 24.

One aspect of the distributor 17 provides for an optical controller 34 and a controllable optical element 18 that can rotate the plane of polarization of a beam of light. The optical controller 34 receives as input the left-eye image data 36 and the right-eye image data 38, and generates in response thereto an angular control signal 42 (i.e. $\phi$). The angular control signal $\phi$ is determined according to the equation $$\oslash xy = \tan^{-1} \sqrt{\frac{Rxy}{Lxy}}.$$

The optical controller 34 can be implemented using electronic hardware or software instructions implemented on a data processor. The angular control signal 42 is operably coupled to each of the picture elements 19 in the controllable optical element 18.

Other features of the optical controller 34 provide for the generation of an angular control signal 42 for each pixel in the final image by determining the resultant angle $\phi$ for the left and right-eye images on pixel by pixel basis. That is, the angle $\phi$ is determined for each pixel in the left and right-eye images. Accordingly, the resultant angular control signal 42 is a matrix of data having a value associated with various x,y coordinates. The data in the control signal 42 is used to control the angle of rotation for each picture element 19 in the controllable optical element 18.

The controllable optical element 18 can be formed of a transmissive twisted nematic Liquid Crystal Display (LCD) having its polarization sheets removed. A LCD is formed of a liquid crystal located between glass plates which have conductive layers just beneath the non-conducting orientation layers. The orientation layer is made of a polymer which is buffed or rubbed in a manner which causes the liquid crystal molecules immediately adjacent to lie parallel to the rubbing direction. The glass panels are mounted such that the rubbing directions are orthogonal. This causes the molecules in the liquid between the two orientation layers to twist to accommodate the orthogonality of the two opposed orientation layers. The twisted liquid crystal material tends to rotate the plane of polarization of the incident light in the same direction as the twist. The twisted liquid crystal therefore causes a rotation of the plane of polarization. When an electric field is applied across the liquid crystal, the liquid crystal molecules align parallel to the electric field, and when the applied electric field is removed the liquid crystals return to their normal configuration.

The analyzer 20 receives the beam of distributed light 30, and forms a left-eye image 50 and a right-eye image 48. The analyzer 20 is depicted as a pair of glasses having one lens with a polarizing axis 22 and another lens with a polarizing axis 24. The distributed light 30 is decomposed by the lenses of analyzer 20 into a left-eye image 50 viewed by an observer's left-eye 46, and a right-eye image 48 viewed by an observer's right-eye 48. This results in the viewer perceiving a stereoscopic image.

Figure 2:
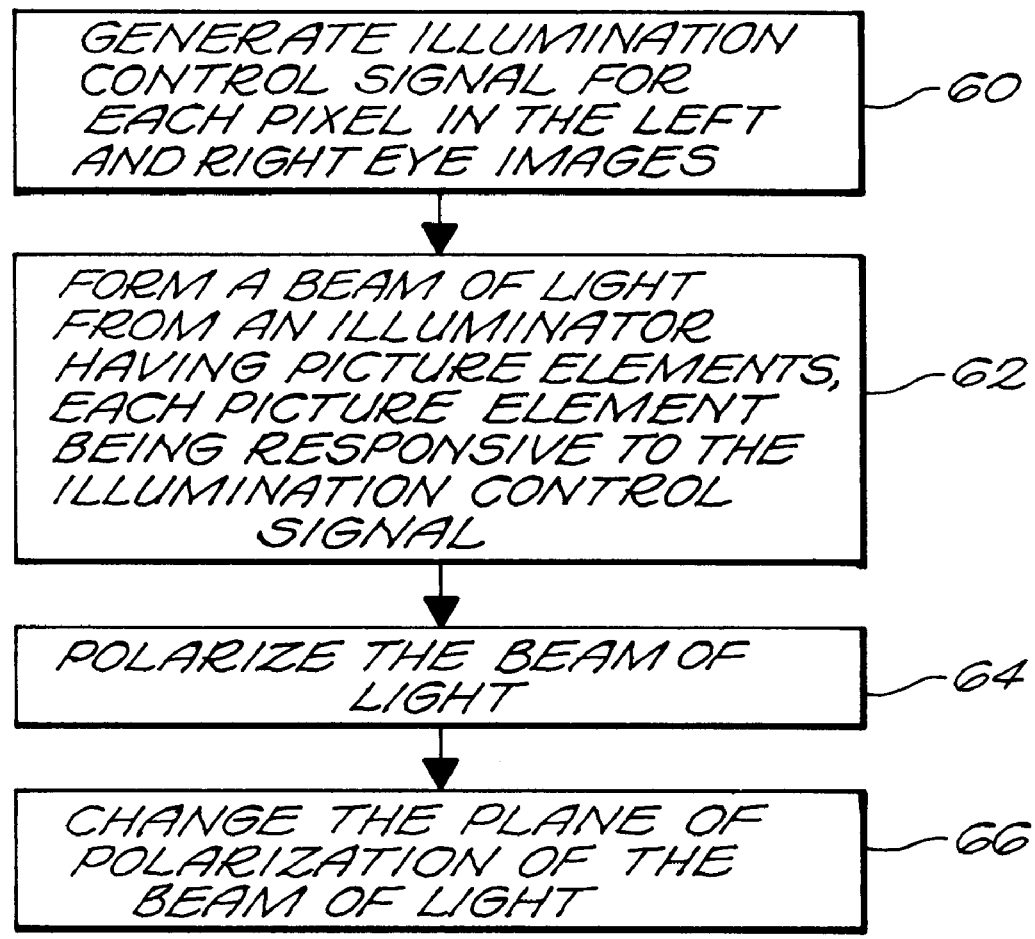
FIG. 2 is a flow chart of the steps for electronically displaying a stereo image according to the invention.

FIG. 2 shows the method steps for electronically displaying a stereo image. In step 60 the electronic stereoscopic display 10 generates illumination control signals; in step 62 the electronic stereoscopic display forms a beam of light in response to the generated control signals; in step 64 the electronic stereoscopic display 10 polarizes the beam of light; and in step 66 the electronic stereoscopic display 10 changes the plane of polarization of the beam of light. These steps are further illustrated with reference to FIGS. 3–5.

In step 60, the modulator 32 generates an illumination control signal 40. The illumination control signal Mxy can be generated according to the equation Mxy=Lxy+Rxy. The illumination control signal can be generated on a pixel by pixel basis. That is, for each pixel in the left-eye image 36 and the right-eye image 38, the modulator forms a single control signal 40.

In step 62 of FIG. 2, the illuminator 12 generate the beam of light 26 in response to the illumination control signal Mxy. Preferably, the illuminator has an array of picture elements corresponding to the number of pixel elements in the left and right eye images 36, 38. Each picture element in the illuminator can then generate a beam of light corresponding to x,y coordinate in the control signal Mxy. Accordingly, a beam of light of variable intensity is generated based upon each pixel in the left and right eye images.

Figure 3:
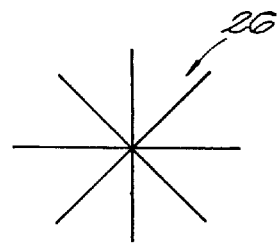
FIG. 3 is a cross-sectional view taken along lines 3—3 of FIG. 1.

The illuminator 12 generates a beam of light 26 that is typically non-polarized light. FIG. 3 shows a cross-section of the beam of light 26 take along the cross-sectional view lines 3—3 of FIG. 1. The beam of light shown in FIG. 3 has no preferred direction of polarization.

Figure 4:
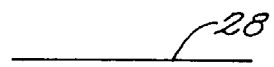
FIG. 4 is a cross-sectional view taken along lines 4—4 of FIG. 1.

In step 64 of FIG. 2, the polarizer 16 polarizes the light beam 26 to generate a polarized beam of light 28. FIG. 4 illustrates a cross-sectional view of the polarized beam of light taken along lines 4—4 of FIG. 1.

Figure 5:
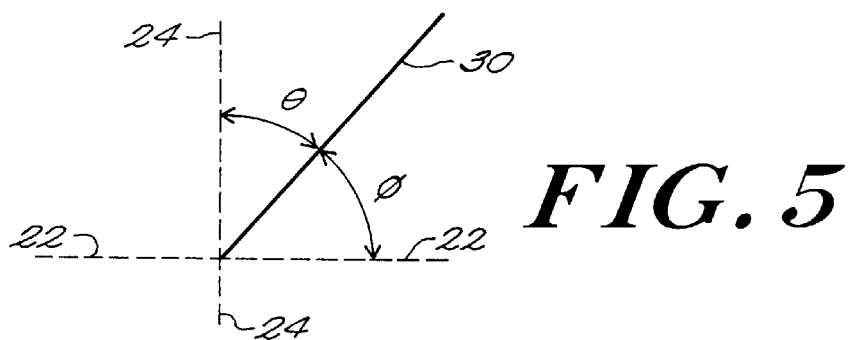
FIG. 5 is a cross-sectional view taken along lines 5—5 of FIG. 1.

In step 66 of FIG. 2, the distributor 17 changes the plane of polarization of the beam of light 28 to form a distributed beam of light 30. In one aspect of the invention, the distributor 17 rotates the plane of polarization of the light beam 28. The beam of light 28 from the polarizer 16 has an intensity Mxy associated with light polarized in a single direction. The distributor 17 rotates the angle of polarization of light beam 28 such that the total intensity in the resultant light beam 30 can be distributed into the appropriate fractions that go to the left and right eyes 44, 46. FIG. 5 illustrates a cross- sectional view of the distributed beam of light 30 taken along lines 5—5 of FIG. 1. The distributed beam of light shown in FIG. 5 is rotated by an angle $\phi$ relative to axis 22 (or by an angle $\Theta$ relative to axis 24). By rotating the beam of light, the distributor allows the beam of light to be decomposed by the analyzer 20 into components parallel to axis 22 and components parallel to axis 24.

In accordance with one aspect of the invention, the rotational angle $\theta$ can be determined as a function of the left-eye image data 36 and the right-eye image data 38. The angle $\theta$ can be determined according to the equation $\phi=\arctan(\sqrt{Rxy/Lxy})$ The distributor 17 can then rotate the plane of polarization of the beam of light 28 by the determined angle $\theta$.

Preferably, the distributor 17 has an array of elements corresponding to the number of pixel elements in the left and right eye images 36, 38. Each picture element in the distributor can then rotate a beam of light corresponding to x,y coordinates in the left and right eye images.

Figure 6:
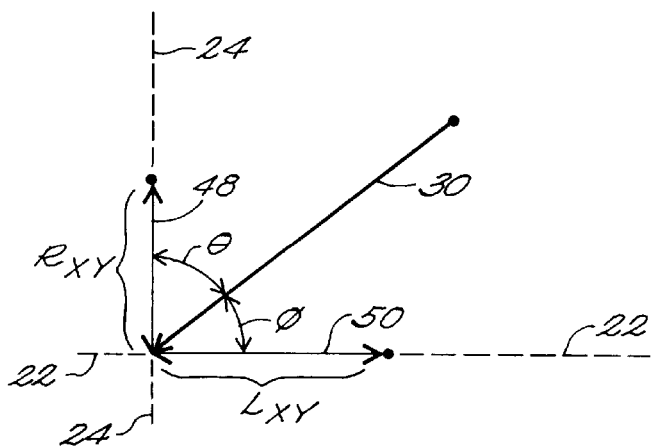
FIG. 6 graphically illustrates the energy distribution of ray 30 of FIG. 1 into its orthogonal components.

FIG. 6 further illustrates how the distributed beam of light 30 is broken down into components representing the left and right-eye images by the analyzer 20. The polarized light beam 28 enters the distributor 17 with its plane of polarization parallel to the axis of polarization 27 of the polarizer 16. For purposes of explanation, the polarizer 26 and the analyzer 20 are oriented so that the plane of polarization of the polarized light beam 28 is also parallel to the polarizing axis 22 of analyzer 20. This orientation of the polarizer relative to the analyzer provides a convenient way to determine the rotational angle $\phi$.

The distributor 28 rotates the light beam 28 counter-clockwise through an angle $\phi$ to form the light beam 30, as shown in FIG. 6. The light beam 30 is then separated by the analyzer 20 into a component parallel to axis 22 and a component parallel to axis 24. When determining the angle $\phi$ the electronic stereoscopic display must account for Malus's law.

Malus's law explains that when linearly polarized light passes through a second polarizer having a transmission axis at an angle $\Omega$ relative to the transmission axis of the first polarizer, the linearly polarized light may be resolved into two components, one parallel and the other perpendicular to the transmission axis of the second polarizer. Only the parallel component, of amplitude E Cos $\Omega$, will be transmitted by the second polarizer. The transmitted intensity is maximum when $\Omega=0$ degrees, and is zero when $\Omega=90$ degrees. At intermediate angles, since the quantity of energy is proportional to the square of the amplitude, Malus's law states:

$I=I_{max} \cos^2 \Omega$, where

"$I_{max}$" is the maximum amount of light transmitted, and "I" is the amount transmitted at the angle $\Omega$.

According to Malus's Law, the amount of energy that the distributed beam of light 30 has in the left-eye direction 22 is $Lxy=Mxy \cos^2\phi$ similarly for the right-eye direction 24

$Rxy = Mxy \cos^2\theta = Mxy \sin^2\varnothing$

Therefore $\dfrac{Rxy}{Lxy} = \dfrac{\sin^2\varnothing}{\cos^2\varnothing} = \tan^2\varnothing$ or $\varnothing = \tan^{-1}\sqrt{\dfrac{Rxy}{Lxy}}$ Note that there can be many different but equivalent variations. For example, $\phi$ could be clockwise or the incoming light could be polarized in the direction 24 and then rotated counter-clockwise through the angle $\theta$.

Malus's Law further illustrates that the combined intensity signal Mxy=Lxy+Rxy. In particular, since Lxy=Mxy $\cos^2 \phi$ and Rxy=Mxy $\sin^2\phi$, then Lxy+Rxy=Mxy($\cos^2 \phi+\sin^2 \phi$)=Mxy.

Figure 7:
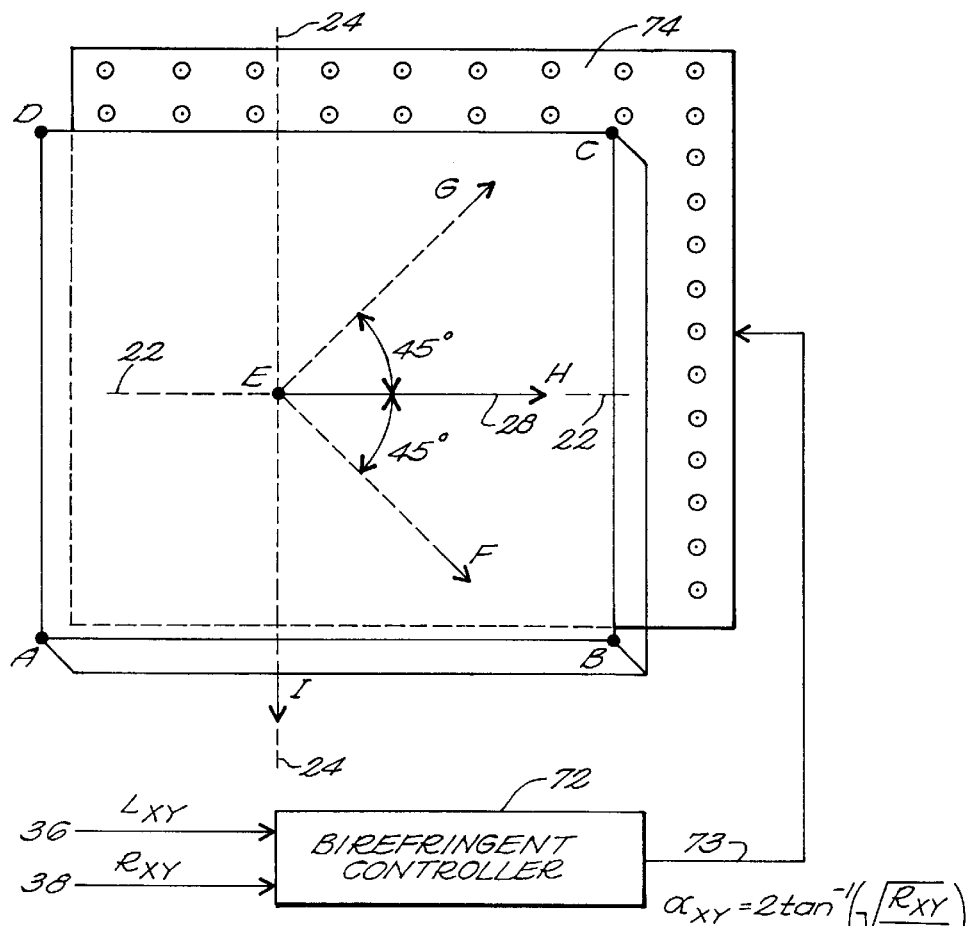
FIG. 7 schematically shows another aspect of the distributor of FIG. 1.

FIG. 7 schematically shows another example of the distributor 17 of FIG. 1. In this aspect of the invention, the distributor 17 can include an electrically controlled birefringent device 70 operably coupled with a birefringent controller 72. The birefringent device 70 can be a Liquid Crystal Display pixel 70 having boundaries ABCD. The birefringent controller 72 can be implemented using electronic hardware or a set of software instructions executed on a data processor. The birefringent controller 72 generates an angle of retardation control signal 73 in response to input signals representative of the left-eye image data set 36 and the right-eye image data set 38. The birefringent device 70 then changes the polarization of the light beam 28 in response to the angle of retardation control signal 73.

Birefringent materials are those materials that can introduce phase shifts between the Ordinary and Extraordinary rays of light that pass through the birefringent material. The phase shifts in the Ordinary and Extraordinary waves (i.e. O-waves and E-waves) result from the rays traveling at different speeds through the birefringent material, corresponding to the two different indexes of refraction of the birefringent material. Thus, if an O-wave and E-wave are in phase as they enter a birefringent material, they are in general not in phase when they emerge. The phase difference between the E- and O-waves depend upon: (1) the frequency of light; (2) the indexes of refraction of the birefringent material; and (3) the thickness of the birefringent material.

With further reference to FIG. 7, a controllable optical element 18 formed from nematic liquid crystal 70 having its director along the line EF, and a birefringent controller 72 is shown. The director of the nematic liquid crystal 70 is aligned along EF throughout the thickness of the liquid crystal display. That is the liquid crystal is not a twisted nematic liquid crystal display. The birefringent controller generates the angular control signal 73 in response to the input signals 36, 38. The angular control signal 73 can alter the director EF in crystal 70 by applying an electric field 74, thereby altering the angle of retardation of the liquid crystal display.

The director of the liquid crystal 70 is initially positioned along the line EF when the E-field 74 is zero. The birefringent controller 72, however, can change the value of the E-field by applying a voltage across a set of capacitor plates positioned adjacent the liquid crystal 70. By applying a positive E-field across the liquid crystal display 70, the controller 72 alters the director and the associated angle of retardation of the liquid crystal display 70. The change in the angle of retardation of the display 70 in turn changes the shape of the elliptically polarized light exiting the liquid crystal display. As the shape of the elliptically polarized light changes, the intensity of the rays 48, 50 exiting the analyzer 20 change. Accordingly, by controlling the angle of retardation of the birefringent material 70, the desired left-eye and right-eye images 48, 50 can be formed at the viewer's eyes 44, 46.

For instance, an incoming beam of light 28 polarized in the direction EH has equal components in the directions EG and EF. The component of polarization parallel to EG will travel more rapidly than that parallel to EF, and the liquid crystal display exhibits birefringence.

If we design the liquid crystal display so that d Δn=½, where d is the thickness of the liquid crystal display, λ is the wavelength of the light beam 28, and Δn is the birefringence of the liquid crystals then the plane of polarization of the incoming light will be rotated 90° clockwise into direction EI. In this condition, all the energy of the Modulator image will be directed to the right-eye 44. This is the well-known behavior of a half-wave retarder. If we denote the phase angle retardation by Δ, then in the above case, Δ=180°.

If an electric field is now applied across the liquid crystal display, pulling the nematic liquid crystals out of the plane of ABCD, then the phase angle of retardation Δ is reduced and becomes 0 when the nematic liquid crystals are perpendicular to the plane, and the plane of the polarization of the incoming light is unrotated. In this condition all the energy of the beam of light 30 is directed to the left-eye 46.

If the angle of retardation is set to 90° (equivalent to a ¼ plate), we have circularly polarized light rotating clockwise, with equal components in the EI and EH direction. In this condition the energy of the beam of light 30 is divided equally between the two eyes 44, 46. Accordingly, the angle of retardation can be varied as desired from 180° to 0° to produce appropriate elliptically polarized light that when decomposed by the analyzer 20 generates the desired left and right-eye images. The angle of retardation, $\alpha_{xy}$, can be determined according to the equation $$\alpha_{xy} = 2\tan^{-1}\sqrt{\frac{Rxy}{Lxy}}.$$

Figure 8:
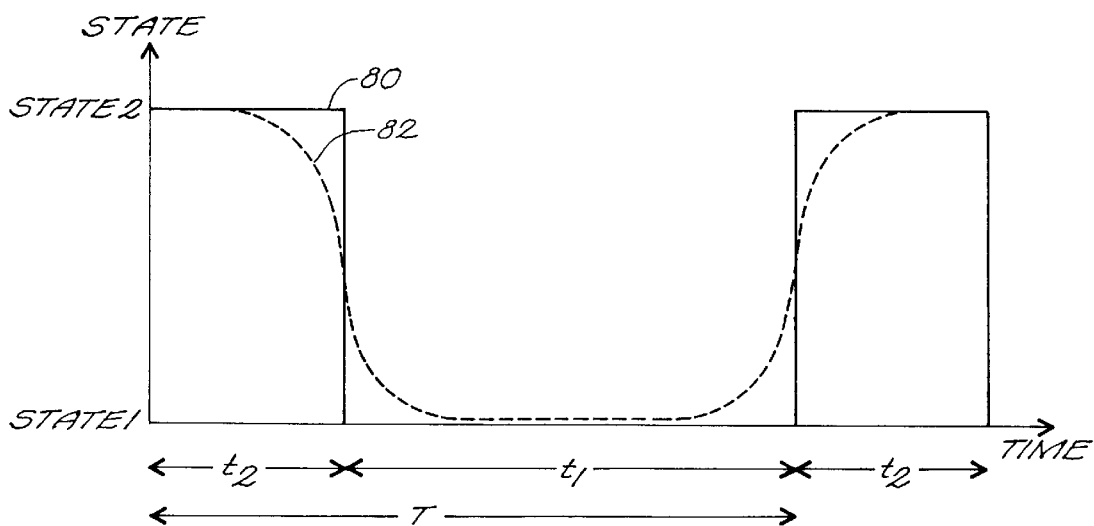
FIG. 8 is a timing diagram for another aspect of the distributor of FIG. 8.

FIG. 8 shows a timing diagram illustrative of another aspect of the distributor of FIG. 1. According to this aspect of the invention, the controllable optical element 18 is periodically cycled between a First State wherein the left-eye image is passed and the right-eye image is blocked, and a Second State wherein the left-eye image is blocked and the right-eye image is passed. The vertical axis of FIG. 8 maps the States of the Controllable Optical Element 18 and the horizontal axis of FIG. 8 maps the time period during which the Optical Element 18 is in each state.

The solid line 80 of FIG. 8 illustrates an aspect of the invention wherein the controllable optical element 18 rapidly changes between the First State and the Second States. In an alternative aspect of the invention, as illustrated by the broken line 82, the controllable optical element 18 does not change states instantaneously. In either case, the state changes occurs periodically. Preferably, the frequency of cycling between the First State (i.e. left-eye image passed) and the Second State (i.e. right-eye image passed) is set high enough such that flickering of the images is not noticeable to the human eye. For example, the period of the cycling, T, can be set to 50 milliseconds or less.

The controllable optical element 18, in this embodiment of the invention, can be a twisted nematic liquid crystal display or an electrically controllable birefringent structure. Both of these structures can be cycled between First and Second States. For example, a liquid crystal display acting as the controllable optical element 18 can have its polarizing axis aligned with the axis 22 in the First State, and can have its polarizing axis aligned with the axis 24 in the Second State. Rotating the plane of polarization of the liquid crystal display cycles between First and Second States. An electrically controllable birefringent structure can also be used to cycle between First and Second States. In the First State the light comes out of the liquid crystal display 70 of FIG. 7 polarized in the EH direction (in which case all the Modulator energy goes to the left eye), and in the Second State the light comes out polarized in the EI direction (in which case all the Modulator energy goes to the right eye).

As further illustrated in FIG. 8, the frequency of the cycling between the First and Second States is chosen to reduce flicker. In particular, the time period t1 is the length of time the Optical Element 18 is in the First State and the time period t2 is the length of time the Optical Element 18 is in the Second State. The period of the cycle T=t1+t2. Accordingly, the fraction of the energy of the light beam that goes to the left eye is $$\frac{t1}{T},$$

and the fraction of the energy of the light beam that goes to the right eye is $$\frac{t2}{T}.$$

The period of the cycle, T, is set to be approximately less than or equal to 50 milliseconds in order to reduce flicker.

A color version of the electronic stereoscopic display 10 can be implemented by dividing the pixels into red, green, and blue pixels with the use of appropriate red, green and blue filters according to standard liquid crystal display technology.

While the invention has been shown and described having reference to specific preferred embodiments, those skilled in the art will understand that variations in form and detail may be made without departing from the spirit and scope of the invention.

Having described the invention, what is claimed as new and secured by Letters Patent is:

1. An apparatus for displaying a left-eye image and a right-eye image based upon data representing an intensity distribution, $L_{xy}$, for pixels of the left-eye image and data representing an intensity distribution, $R_{xy}$, for pixels of the right-eye image, the apparatus comprising:

an illuminator having a plurality of picture elements each capable of generating light of varying intensity, a modulator that generates an output signal $M_{xy}$ for each picture element according to the equation $M_{xy}=L_{xy}+R_{xy}$, the set of output signals $M_{xy}$ being used to control the intensity of light generated by each picture element of the illuminator, a polarizer positioned downstream of the illuminator for polarizing the light generated by the illuminator, and a distributor positioned downstream of the polarizer for changing the plane of polarization of the polarized light, such that the left-eye image is displayed in a plane of polarization differing from the plane of polarization of the right-eye image.

2. An apparatus according to claim 1, wherein the modulator includes a processor that forms the signal $M_{xy}$ by summing an intensity distribution associated with a pixel in the left-eye image with an intensity distribution associated with a pixel in the right eye image.

3. An apparatus according to claim 1, wherein the distributor includes an optical controller that generates an output signal φ, as a function of $R_{xy}$ and $L_{xy}$, the output signal φ identifying the rotation angle of the plane of polarization, and a controllable optical element that rotates the plane of polarization of the polarized light in response to the output signal φ.

4. An apparatus according to claim 3, wherein the optical controller generates the output signal φ according to the equation φ=arctan ($\sqrt{Rxy/Lxy}$).

5. An apparatus according to claim 3, wherein the controllable optical element is a liquid crystal display.

6. An apparatus according to claim 1, wherein the distributor includes an optical controller that generates an output signal φ for controlling the rotation angle of the plane of polarization, the output signal φ cycling between a first state and a second state, and a controllable optical element that rotates the plane of polarization of the polarized light in response to the output signal φ, such that the distributor transmits the left-eye image when the output signal is in the first state and transmits the right-eye image when the output signal is in the second state.

7. An apparatus according to claim 1, wherein the distributor includes a birefringent controller that determines the angle of retardation, $α_{xy}$, as a function of $R_{xy}$ and $L_{xy}$, and a controllable birefringent material that introduces a phase difference between the ordinary and extraordinary components of the polarized light in response to the determined angle of retardation, $α_{xy}$.

8. An apparatus according to claim 7 wherein the birefringent controller further comprises a switcher for cycling the angle of retardation of the birefringent material between a first state and a second state, such that the left-eye image and the right-eye image are alternatively displayed.

9. An apparatus according to claim 8, wherein the birefringent controller includes a timer for directing the angle of retardation to 0 degrees for a time t1 and for directing the angle of retardation to 180 degrees for a time t2, wherein t1+t2 is less than 50 milliseconds.

10. An apparatus according to claim 7, wherein the controllable birefringent material is a liquid crystal having its directors substantially uniform throughout the depth of the liquid crystal.

11. An apparatus for concurrently displaying a left-eye image and a right-eye image based upon data representing an intensity distribution, $L_{xy}$, for pixels of the left-eye image and data representing an intensity distribution, $R_{xy}$, for pixels of the right-eye image, the apparatus comprising:

an illuminator having a plurality of picture elements each capable of generating light of varying intensity, a modulator for controlling the intensity of light generated by each picture element of the illuminator, a polarizer positioned downstream of the illuminator for polarizing the light generated by the illuminator along a polarizing axis, and a distributor positioned downstream of the polarizer for rotating the plane of polarization of the polarized light by an angle φ, according to the equation ∠=arctan ($\sqrt{Rxy/Lxy}$).

such that the left-eye image is displayed in a plane of polarization differing from the plane of polarization of the right-eye image.

12. An apparatus according to claim 11, wherein the modulator includes a processor that generates a set of output signals $M_{xy}$ according to the equation $M_{xy}=L_{xy}+R_{xy}$, the set of output signals $M_{xy}$ being used to control the intensity of light generated by each picture element of the illuminator.

13. An apparatus according to claim 12, wherein the processor forms the signal $M_{xy}$ by summing an intensity distribution associated with a pixel in the left-eye image with an intensity distribution associated with a pixel in the right eye image.

14. An apparatus according to claim 11, wherein the distributor includes an optical controller that generates an output signal φ, as a function of $R_{xy}$ and $L_{xy}$, the output signal φ identifying the rotation angle of the plane of polarization, and a controllable optical element that rotates the plane of polarization of the polarized light in response to the output signal φ.

15. An apparatus according to claim 14, wherein the controllable optical element is a liquid crystal display.

16. An apparatus according to claim 11, wherein the distributor includes a switcher for cycling the output signal φ between a first state and a second state, and a controllable optical element that rotates the plane of polarization of the polarized light in response to the output signal φ, such that the distributor transmits the left-eye image when the output signal is in the first state and transmits the right-eye image when the output signal is in the second state.

17. An apparatus for displaying a left-eye image and a right-eye image based upon data representing an intensity distribution, $L_{xy}$, for pixels of the left-eye image and data representing an intensity distribution, $R_{xy}$, for pixels of the right-eye image, the apparatus comprising:

A) an illuminator having a plurality of picture elements each capable of generating light of varying intensity, B) a modulator for controlling the intensity of light generated by each picture element of the illuminator, C) a polarizer positioned downstream of the illuminator for polarizing the light generated by the illuminator, and D) a distributor positioned downstream of the polarizer for changing the plane of polarization of the polarized light, the distributor including a birefringent controller that determines the angle of retardation as a function of $R_{xy}$ and $L_{xy}$, and a controllable birefringent material that introduces a phase difference between ordinary and extraordinary components of the polarized light in response to the determined angle of retardation, such that the left-eye image is displayed in a plane of polarization differing from the plane of polarization of the right-eye image.

18. A method for displaying a left-eye image and a right-eye image based upon data representing an intensity distribution, $L_{xy}$, for pixels of the left-eye image and data representing an intensity distribution, $R_{xy}$, for pixels of the right-eye image, the method comprising the steps of:

generating a set of illumination control signals $M_{xy}$ according to the equation $M_{xy}=L_{xy}+R_{xy}$, forming a beam of light from a picture element in an illuminator, the beam of light having an intensity responsive to the illumination control signal $M_{xy}$, polarizing the beam of light, and changing the plane of polarization of the polarized light such that the left-eye image is displayed in a plane of polarization differing from the plane of polarization of the right-eye image.

19. A method according to claim 18, wherein the step of generating an illumination control signal further comprising the steps of summing an intensity distribution associated with a pixel in the left-eye image with an intensity distribution associated with a pixel in the right eye image.

20. A method according to claim 18, wherein the changing step further comprises generating an angular control signal φ as a function of $R_{xy}$ and $L_{xy}$, the angular control signal φ identifying the rotation angle of the plane of polarization, and rotating the plane of polarization of the polarized light in response to the angular control signal φ.

21. A method according to claim 20, wherein the step of generating the angular control signal φ further comprises forming the angular control signal φ according to the equation $\phi=\arctan(\sqrt{Rxy/Lxy})$.

22. A method according to claim 18, wherein the changing step further includes the steps of determining an output signal φ for controlling the rotation angle of the plane of polarization, the output signal φ cycling between a first state and a second state, and rotating the plane of polarization of the polarized light in response to the output signal φ, such that the left-eye image is transmitted when the output signal is in the first state and the right-eye image is transmitted when the output signal is in the second state.

23. A method according to claim 18, wherein the changing step further includes the steps of determining the angle of retardation as a function of $R_{xy}$ and $L_{xy}$, and introducing a phase difference between the ordinary and extraordinary components of the polarized light passing through the controllable birefringent material in response to the determined angle of retardation.

24. A method according to claim 23, further including the step of cycling the phase angle of retardation of the controllable birefringent material between a first state and a second state, such that the left-eye image and the right-eye image are alternatively displayed.

25. A method according to claim 24, further comprising the steps of setting the phase angle of retardation to approximately 0 degrees for a time t1, and setting the phase angle of retardation to 180 degrees for a time t2 wherein t1+t2 is less than 50 milliseconds.

26. A method for concurrently displaying a left-eye image and a right-eye image based upon data representing an intensity distribution, $L_{xy}$, for pixels of the left-eye image and data representing an intensity distribution, $R_{xy}$, for pixels of the right-eye image, the method comprising the steps of:

generating an illumination control signal $M_{xy}$, forming a beam of light from a picture element in an illuminator, the beam of light having an intensity responsive to the illumination control signal $M_{xy}$, polarizing the beam of light, and rotating the plane of polarization of the polarized light by an angle φ according to the equation $\phi=\arctan(\sqrt{Rxy/Lxy})$, such that the left-eye image is displayed in a plane of polarization differing from the plane of polarization of the right-eye image.

27. A method according to claim 26, wherein the step of generating an illumination control signal further comprises generating the illumination control signal $M_{xy}$ according to the equation $M_{xy}=L_{xy}+R_{xy}$.

28. A method according to claim 27 wherein the illumination control signal $M_{xy}$ is formed by summing an intensity distribution associated with a pixel in the left-eye image with an energy distribution associated with a pixel in the right eye image.

29. A method according to claim 28, wherein the rotating step further comprises generating an angular control signal φ as a function of $R_{xy}$ and $L_{xy}$, the angular control signal φ identifying the rotation angle of the plane of polarization, and rotating the plane of polarization of the polarized light in response to the angular control signal φ.

30. A method for displaying a left-eye image and a right-eye image based upon data representing an intensity distribution, $L_{xy}$, for pixels of the left-eye image and data representing an intensity distribution, $R_{xy}$, for pixels of the right-eye image, the method comprising the steps of:

generating an illumination control signal $M_{xy}$ as a function of $R_{xy}$ and $L_{xy}$, determining an angle of retardation, $\alpha$, as a function of $R_{xy}$ and $L_{xy}$, forming a beam of light from a picture element in an illuminator, the beam of light having an intensity responsive to the illumination control signal $M_{xy}$, polarizing the beam of light, and changing the polarization of the polarized light by introducing a phase difference between the ordinary and extraordinary components of the polarized beam of light with a controllable birefringent material having the angle of retardation $\alpha$ such that the left-eye image is displayed in a plane of polarization differing from the plane of polarization of the right-eye image.

\* \* \* \* \*